(12) United States Patent
Karuppiah et al.

(10) Patent No.: US 7,856,024 B1
(45) Date of Patent: Dec. 21, 2010

(54) METHOD AND APPARATUS FOR INTEGRATING ROUTING AND BRIDGING FUNCTIONS

(75) Inventors: Anuradha Karuppiah, San Jose, CA (US); Samer Isam Nubani, Santa Clara, CA (US); Balaji Rajagopalan, Sunnyvale, CA (US)

(73) Assignee: Tellabs San Jose, Inc., Naperville, IL (US)

( * ) Notice: Subject to any disclaimer, the term of this patent is extended or adjusted under 35 U.S.C. 154(b) by 43 days.

(21) Appl. No.: 12/333,609

(22) Filed: Dec. 12, 2008

(51) Int. Cl.
*H04L 12/28* (2006.01)

(52) U.S. Cl. .................................. 370/401; 709/224

(58) Field of Classification Search ................ 370/390, 370/389, 230, 392, 395, 356, 469, 401; 709/224, 709/236, 229, 245
See application file for complete search history.

(56) References Cited

U.S. PATENT DOCUMENTS

| | | | | |
|---|---|---|---|---|
| 5,432,907 A * | 7/1995 | Picazo et al. | ................ | 709/249 |
| 6,249,820 B1 * | 6/2001 | Dobbins et al. | ............ | 709/238 |
| 6,262,976 B1 * | 7/2001 | McNamara | ................ | 370/254 |
| 6,671,276 B1 * | 12/2003 | Bakre et al. | ............ | 370/395.1 |
| 6,701,361 B1 * | 3/2004 | Meier | ......................... | 709/224 |
| 6,717,913 B1 * | 4/2004 | Ghahremani et al. | ........ | 370/230 |
| 6,747,979 B1 * | 6/2004 | Banks et al. | ................ | 370/401 |
| 6,985,956 B2 * | 1/2006 | Luke et al. | ................... | 709/229 |
| 7,123,615 B2 * | 10/2006 | Weyman et al. | ............. | 370/389 |
| 7,317,722 B2 * | 1/2008 | Aquino et al. | .............. | 370/390 |
| 7,379,475 B2 * | 5/2008 | Minami et al. | .............. | 370/469 |
| 7,385,967 B2 * | 6/2008 | Nagami et al. | .............. | 370/356 |
| 7,466,703 B1 * | 12/2008 | Arunachalam et al. | ...... | 370/392 |
| 7,469,298 B2 * | 12/2008 | Kitada et al. | ................ | 709/236 |
| 7,606,147 B2 * | 10/2009 | Luft et al. | ................... | 370/229 |
| 7,719,966 B2 * | 5/2010 | Luft et al. | ................... | 370/229 |
| 2002/0112076 A1 * | 8/2002 | Rueda et al. | ................ | 709/245 |
| 2005/0094640 A1 * | 5/2005 | Howe | ...................... | 370/395.1 |
| 2007/0233857 A1 * | 10/2007 | Cheng et al. | ................ | 709/224 |
| 2007/0248085 A1 * | 10/2007 | Volpano | ..................... | 370/389 |

* cited by examiner

*Primary Examiner*—Thong H Vu
(74) *Attorney, Agent, or Firm*—James M. Wu; JW Law Group

(57) ABSTRACT

An apparatus and method for routing data packets between a routed network and a local bridged network using integrated routing and bridging ("IRB") functions are disclosed. In one embodiment a bridge interface between a host in the local bridge network and a bridging engine is IRB enabled. An unnumbered Internet Protocol ("IP") interface is then added between the host and a routing engine in accordance with the IRB enabled bridge interface. Subsequently packets received from the routed network are forwarded directly by the routing engine to the host in the local bridge network via the unnumbered IP interface, thereby bypassing the bridging engine. Through use of an embodiment of the present invention, packet processing delay in each network device is reduced (because of bypassing the bridging engine), thereby decreasing packet latency in an ever growing network.

20 Claims, 3 Drawing Sheets

METHOD AND APPARATUS FOR INTEGRATING ROUTING AND BRIDGING FUNCTIONS

FIELD

The exemplary embodiment(s) of the present invention relates to communications network. More specifically, the exemplary embodiment(s) of the present invention relates to routed and bridged networks.

BACKGROUND

A high-speed network environment typically includes network devices such as routers and bridges used for facilitating delivery of information packets and/or data traffic from source devices to destination devices. Information pertaining to the transfer of packet(s) through the network is usually embedded within the packet itself. Each packet traveling through one or more communications networks such as Internet and/or Ethernet can typically be handled independently from other packets in a packet stream or traffic. For example, each router which may include routing and bridging engines processes incoming packets and determines where the packet(s) should be forwarded. In a high-speed computing network environment, the speed of packet processing, which includes routing, bridging, and/or both, can be critical in determining the overall performance of a network system.

To route a packet or data stream between Local Area Network ("LAN") and Wide Area Network ("WAN"), a router typically includes a routing engine and a bridging engine. While the routing engine may be used to handle the routing activities between WAN and the router, the bridging engine is used to forward data packets between LAN and the router. Note that bridging and routing engines are both transporting and controlling data packets, but they work through different methods. Bridging takes place at layer 2 or data link layer while routing takes place at layer 3 or Network Layer. It should be noted that a bridging engine directs frames according to hardware assigned MAC (Media Access Control) addresses while a routing engine makes its decisions according to arbitrarily assigned IP Addresses. Since a bridging engine typically uses a data link layer or layer 2 switch for data forwarding while a routing engine employs a layer 3 switch for passing data packets, transporting a packet from a source via a WAN to a host over a LAN typically requires the packet to travel through both the routing engine and the bridging engine in order to reach its destination.

To forward IP traffic from a routed interface of a routing engine to a bridge-group of a bridging engine, a conventional network device is required to first route the packets, and subsequently bridge each packet to one or more destinations. A problem associated with bridging interface and routing interface is that although a network device may have the capability to route and bridge separate traffic streams at the same time, it is typically unable to run both routing and bridging on the same packet at the same time. Having each packet traveling through both routing and bridging engines while being forwarded from a routed network to a bridged network increases packet latency, which negatively affects the overall network performance.

SUMMARY

An apparatus and method for routing data packets between a routed network and a local bridge network using integrated routing and bridging ("IRB") functions are disclosed. In one embodiment a bridge interface between a host in the local bridge network and a bridging engine is IRB enabled. An unnumbered Internet Protocol ("IP") interface is then added between the host and a routing engine in accordance with the IRB enabled bridge interface. Subsequently packets received from the routed network are forwarded directly by the routing engine to the host in the local bridge network via the unnumbered IP interface, thereby bypassing the bridging engine. Through use of an embodiment of the present invention, packet processing delay in each network device is reduced (because of bypassing the bridging engine), thereby decreasing packet latency in an ever growing network.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Exemplary embodiment(s) of the present invention is described herein in the context of a method, device, and apparatus of converting IRB enabled bridge interfaces to unnumbered IP interfaces to enhance overall routing performance.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of this disclosure.

A process of routing data packets between a routed network and a local/regional bridge network using integrated routing and bridging ("IRB") functions is disclosed. In one embodiment a bridge interface between a host in the local bridged network and a bridging engine is IRB enabled. An unnumbered Internet Protocol ("IP") interface is then added between the host and a routing engine in accordance with the IRB enabled bridge interface. Subsequently packets received from the routed network are forwarded directly by the routing engine to the host in the local bridged network via the IP unnumbered interface, thereby bypassing the bridging engine.

Figure 1:
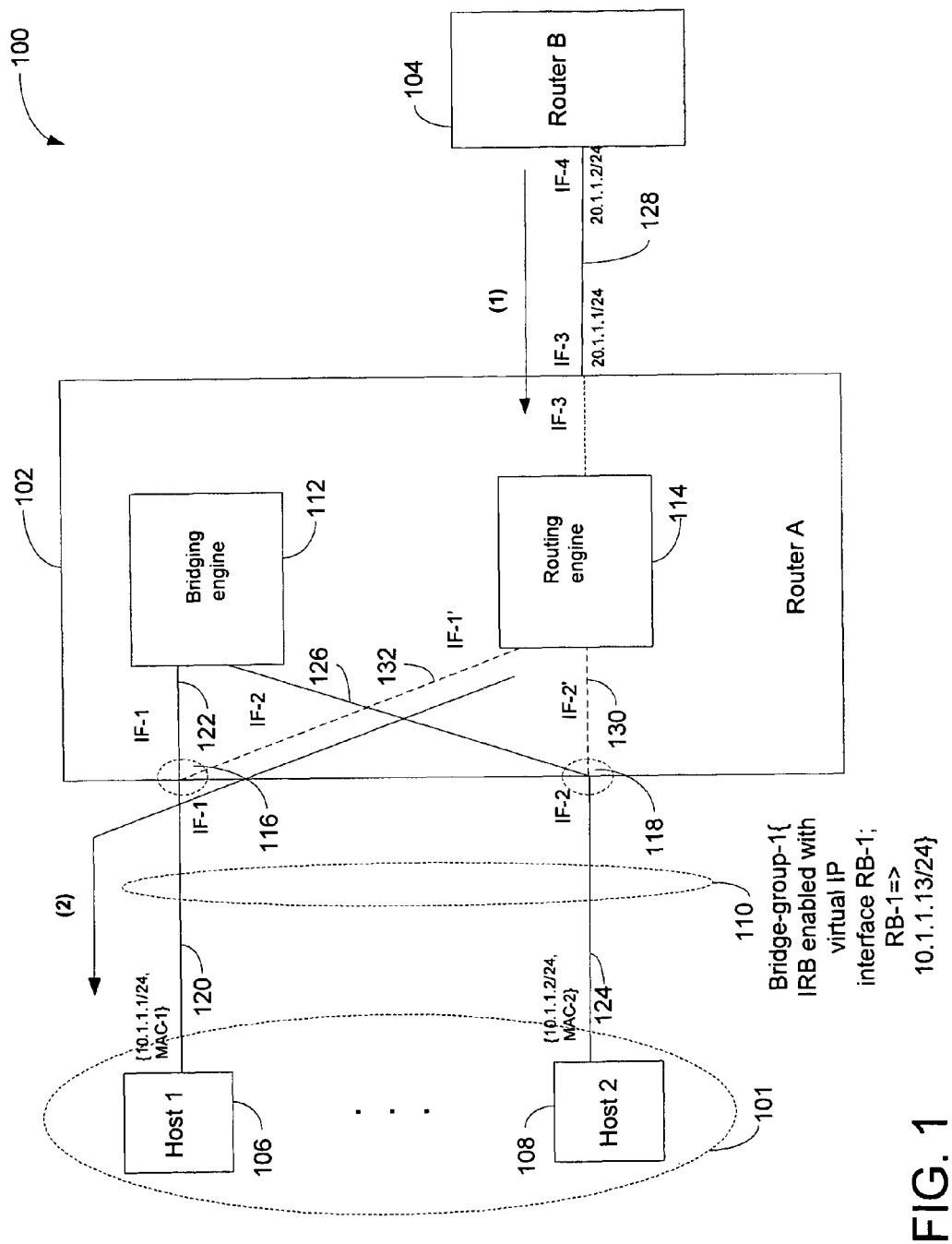
FIG. 1 is a block diagram illustrating a network system capable of routing data packets using integrated routing and bridging ("IRB") interface in accordance with one embodiment of the present invention.

FIG. 1 is a block diagram 100 illustrating a network system capable of routing data packets using integrated routing and bridging ("IRB") interface in accordance with one embodiment of the present invention. Diagram 100 includes a bridge-group of hosts 101, a router A 102, and a router B 104. Router A includes a bridging engine 112 and a routing engine 114, wherein routing engine 114 is coupled to router B via one or more Internet Protocol ("IP") interfaces such as IF-3 and IF-4. The terms "IF-3" and "IF-4" are the abbreviation of interface 3 and interface 4, and they are coupled by a network segment 128. Bridging engine 112 is configured to couple to group 101 via bridging interfaces such as IF-1 and IF-2, wherein bridge-group 101 includes multiple hosts 106-108 such as host 1 and host 2. It should be noted that the underlying concept of the exemplary embodiment(s) of the present invention would not change if one or more blocks (circuit) were added to or removed from diagram 100.

A function of router A is to route data packets between router B and group 101 via a WAN and LAN networks. In one embodiment, router A, which implements IRB, is capable of directly routing a data stream or IP traffic from a routed network to a bridge-group without passing through bridging engine 112. It should be noted that the terms "data stream," "IP traffic," "packet stream," and "packets" can be used interchangeably. Router A, for instance, is capable of internally converting IRB enabled bridge interfaces into unnumbered IP interfaces to enable directly routing between routing engine 114 and hosts 106-108. For example, a packet stream can be routed directly from a routed network (e.g. router B) to a host (e.g. host 1) without the need for bridging the packet stream.

Bridge-group 101 includes multiple hosts 106-108 wherein each host is linked by a network bridge, a local network, an Ethernet connection, a LAN connection, and/or any other types of regional network connections. Hosts can be computers, printers, cellular phones, smart phones, personal digital assistants ("PDAs"), et cetera. When they need to communicate with each other, a network bridge can be used to handle the data traffic within a bridge-group such as group 101. A network bridge or a bridge, in one example, uses layer 2 switch or data link layer to connect various network segments. For example, in Ethernet, the bridge uses hardware addresses such as MAC (Media Access Control) addresses to direct packet transfers between the hosts.

Bridging engine 112, in one embodiment, is responsible for handling packet traffic for the bridge-group, which, for example, includes hosts 106-108, via hardware addresses. For example, bridging engine 112 is coupled to host 1 via network segments 120-122 and host 2 via network segments 124-126. To transfer a packet to host 1, engine 112, for instance, encapsulates MAC address of MAC-1 as hardware address in the header of the packet and forwards the encapsulated packets to host 1 via bridging interface IF-1. It should be noted that network segments 120-122 or 124-126 can be a single network segment.

Routing engine 114, in one embodiment, is capable of handling packets traffic for the routed network including router B via a communications network, such as an Internet, WAN, Metropolitan Area Network (MAN), Global Area Network (GAN), and the like. For instance, routing engine 114 is capable of communicating with router B via IP interfaces such as IF-3 and IF-4. To transfer a packet between router A and router B, routing engine 114, for example, uses IP address which is also referred to as the Layer 3 (L3) address or network layer address to transfer data packets via network segment 128.

The unnumbered IP interface is a network function in which it borrows an IP address from another interface which is already configured and has a valid IP address. In other words, the configuration of unnumbered IP interface enables IP processing on an interface without assigning it an IP address. An unnumbered IP interface does not have an IP address assigned to it. Multiple unnumbered IP interfaces can be associated with the same numbered IP interface. A benefit of using unnumbered IP interfaces is to conserve network and address space.

In one embodiment, router A internally converts IRB enabled bridge interfaces into unnumbered IP interfaces and the unnumbered IP interfaces are subsequently used to route packets directly from routing engine 114 to bridge-group without passing through bridging unit 112. For example, bridge interface IF-1 is internally converted to an unnumbered IP interface IF-1' and bridge interface IF-2 is internally converted to an unnumbered IP interface IF-2'. Unnumbered IP interfaces IF-1' and IF-2' enable routing engine 114 to directly forward packets to host 1 and host 2 via connections 130 and 132. The unnumbered IP interfaces IF-1' and IF-2' can be associated with a virtual numbered IP interface such as RB-1 ("Routed Bridge" interface) which has an IP network of 10.1.1.3/24. In this case the complete bridge network 110 in FIG. 1 is treated as a single broadcast interface RB-1.

During an operation, when IRB is enabled on bridge-group, bridge interfaces IF-1 and IF-2 are internally converted into unnumbered IP/routed interfaces IF-1' and IF-2' associated with the virtual numbered IP interface RB-1. IF-1 and IF-2, for example, are Ethernet bridge interfaces while IF-3 and IF-4 are IP/routed interfaces which may be configured by a user. Upon receipt of IP traffic from router B to router A, routing engine 114 is capable of sending the traffic to host 1 via IF-1'.

An advantage of employing unnumbered IP interfaces with IRB function is to enhance the performance of routing speed. For example, IRB function using unnumbered IP interfaces can directly forward a packet from routing engine 114 to host without going through bridging engine 112. It should be noted that abbreviations of "IF-1," "IF-2," "IF-3," "IF-4," "IF-1'," and "IF-2'" will be used in the following description for the same or substantially the same meanings.

Figure 2:
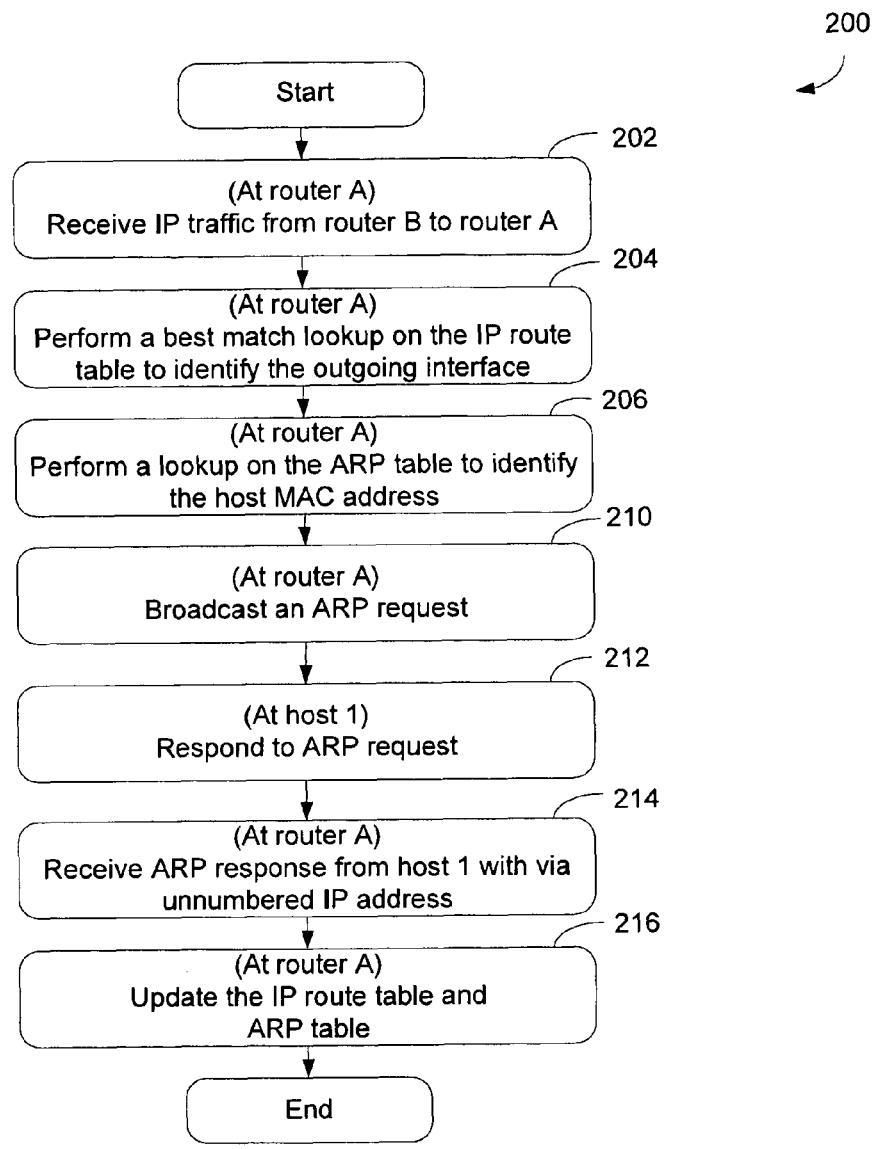
FIG. 2 is a flowchart illustrating how the IP route table is populated using IRB in accordance with one embodiment of the present invention.

FIG. 2 is a flowchart 200 illustrating a mechanism used for populating the routing table with host IP addresses in the bridge network using IRB in accordance with one embodiment of the present invention. At block 202, a routing process utilizing IRB with unnumbered IP interfaces receives IP traffic from router B to router A. IP traffic is, for example, initiated by router B and has a source IP address of 20.1.1.2. The destination of the IP traffic is host 1 with an IP address of 10.1.1.1. In one embodiment, the IP traffic is sent to the routing engine of router A via a routed interface IF-3 as illustrated in FIG. 1.

At block 204, upon receipt of the IP traffic from router A, the process searches an "IP route table" using the destination IP address as the key to identify the outgoing interface. To start, router A has an IP route table that may contain information as follows, (Entry-1) Key {10.1.1.0/24}⇒Result {outgoing interface=RB-1}

(Entry-2) Key {20.1.1.0/24}⇒Result {outgoing interface=IF-3}

A best match lookup can be performed via the route table using the destination IP address of 10.1.1.1. Hence the lookup matches "Entry-1" with the outgoing interface of RB-1.

At block 206, the process at router A initiates a search on the "ARP table" using the destination IP address of 10.1.1.1 to identify an entry with the host MAC address or a hardware address. ARP (Address Resolution Protocol) is a technique for finding a host's hardware address when only its network layer address is known. The process, in one example, performs an ARP lookup to identify host 1 MAC address and adds an Ethernet encapsulation if a valid MAC address is found. It should be noted that a lookup function verifies whether or not an ARP entry exists in the table. In one embodiment, a MAC key is generated and a MAC result is subsequently obtained if it is located in the ARP table. Initially, router A does not have an ARP entry with the key of 10.1.1.1. Hence the ARP lookup fails (As a result of the ARP lookup failure the process proceeds to 210).

At block 210, the process at router A generates an ARP request for host 1, for instance, and subsequently broadcasts the ARP request to all of the bridging interfaces such as IF-1 and IF-2, as shown in FIG. 1. Since the ARP table does not contain an entry for the MAC address of host 1, the IP traffic or packet can be categorized or treated as a first IP packet of a data stream. Such packets can be discarded or queued up for subsequent processing based on the implementation. For the sake of simplicity, we assume that such packets are discarded and the IP route table is populated with the route for 10.1.1.1/32 as described in block 216.

At block 212, host-1 responds to the ARP request from router A for IP address 10.1.1.1 with a MAC address of MAC-1.

At block 214, router A receives a response to the ARP request, wherein the response includes MAC address of a host. For example, the process receives an ARP response over IF-1' from host 1 with information including IP address of 10.1.1.1/32 and MAC address of MAC-1.

At block 216, after receipt of ARP response, router A updates the IP route table by creating a new route entry containing information such as 10.1.1.1/32 indicating an outgoing interface of IF-1'. Now the IP route table on router A has the following entries—

(Entry-1/New entry) Key {10.1.1.1/32}⇒Result {outgoing interface=IF-1'}
(Entry-2) Key {10.1.1.0/24}⇒Result {outgoing interface=RB-1}
(Entry-3) Key {120.1.1.0/24}⇒Result {outgoing interface=IF-3}

The process also add an ARP entry in the ARP table to include information relating to host 1 with a destination MAC address such as MAC-1. Now the ARP table on router A has the following entries, (Entry-1/New entry) Key {10.1.1.1}⇒Result {MAC=MAC-1}

Figure 3:
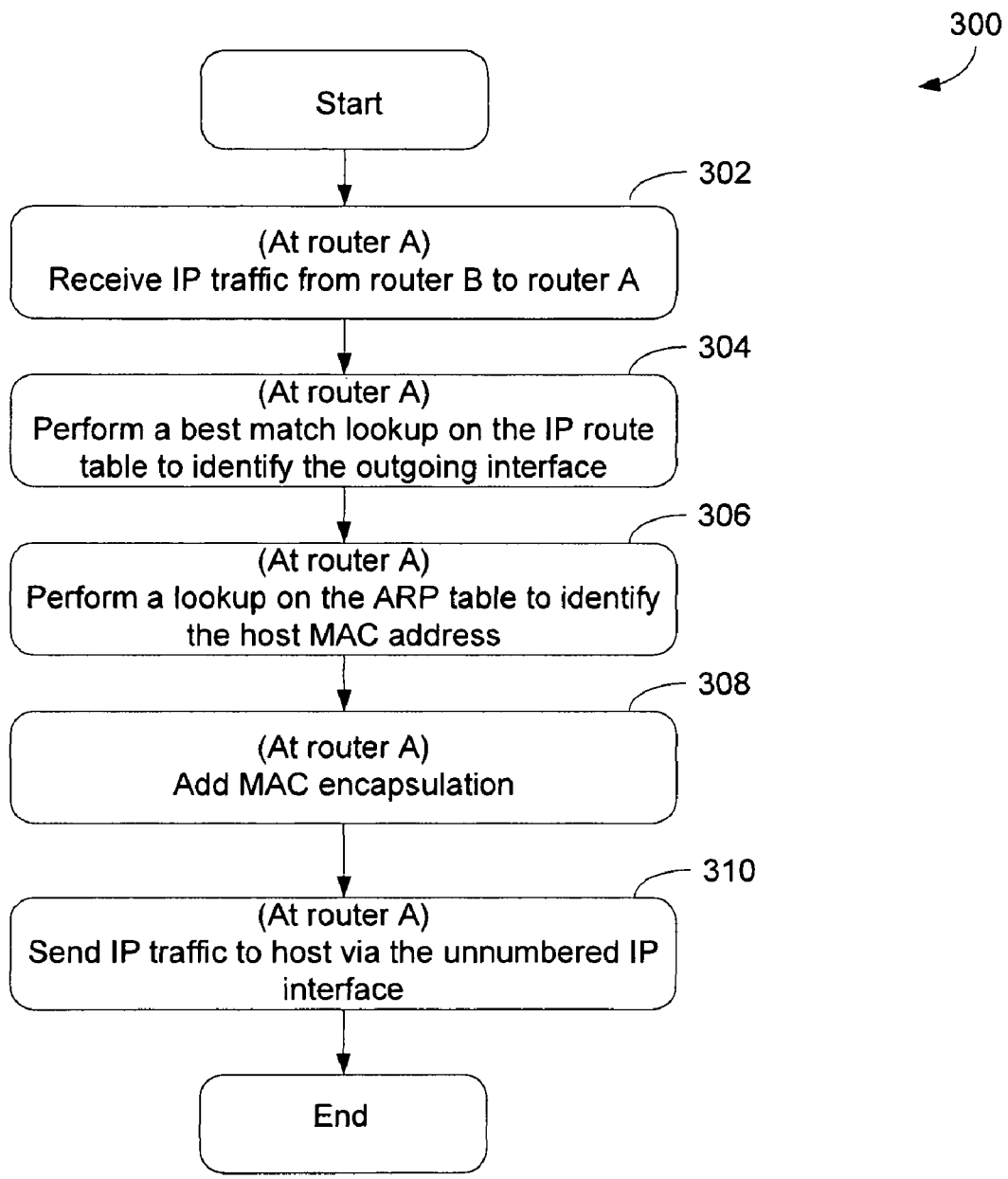
FIG. 3 is a flowchart illustrating a routing process capable of routing subsequent packets directly from a routing engine to a host in the bridge network using IRB in accordance with one embodiment of the present invention.

FIG. 3 is a flowchart 300 illustrating a routing process capable of routing subsequent packets directly from a routing engine to a host using IRB in accordance with one embodiment of the present invention. At block 302, a routing process utilizing IRB with unnumbered IP interfaces receives subsequent IP traffic or packets from router B to router A. Subsequent IP packets indicate that the destination IP address has already been processed and identified. Referring back to FIG. 1, the subsequent IP traffic can be sent by router B with a source IP address of 20.1.1.2. The destination of the IP traffic is, for example, host 1 having an address of 10.1.1.1. The IP traffic is sent to the routing engine of router A via a routed interface IF-3 as shown in FIG. 1.

At block 304, upon receipt of the subsequent IP traffic, router A performs a best match lookup on the IP route table using the destination IP address. As a result of the processing described in FIG. 2, the IP route table on router A has the following entries, (Entry-1) Key {10.1.1.1/32}⇒Result {outgoing interface=IF-1'}
(Entry-2) Key {10.1.1.0/24}⇒Result {outgoing interface=RB-1}
(Entry-3) Key {20.1.1.0/24}⇒Result {outgoing interface=IF-3}

Hence, a lookup using destination IP address of 10.1.1.1 yields a result with an outgoing interface of IF-1' (an unnumbered IP interface connected to Host 1).

At block 306, router A initiates a search on the ARP table using the destination IP address to identify the host MAC address or a hardware address. As a result of the processing described in FIG. 2, the ARP table on router A has the following entries, (Entry-1) Key {10.1.1.1}⇒Result {MAC=MAC-1}

Hence a lookup using destination IP address of 10.1.1.1 yields a result with a MAC address of MAC-1 (this is the MAC address of Host 1).

At block 308, after obtaining the MAC result, router A determines whether or not a valid MAC address is found. MAC address is subsequently encapsulated in the MAC header of the IP packet(s).

At block 310, after encapsulation, the IP traffic or packet(s) is forwarded to the destination host via an unnumbered IP interface. For example, routing engine is capable of forwarding the subsequent IP traffic with MAC-1 to host 1 (i.e. with a destination IP address of 10.1.1.1) through IF-1'.

While particular embodiments of the present invention have been shown and described, it will be obvious to those of skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for data transfer between a routed network and a bridge network, comprising:

identifying a first bridge interface that has been integrated routing and bridging ("IRB") enabled bridge interface between a first host in a local bridge network and a bridging engine;

adding a first unnumbered internet Protocol ("IP") interface between the first host and a routing engine in accordance with the first bridge interface; and forwarding packets directly by the routing engine from the routing engine to the first host via the first unnumbered IP interface.

2. The method of claim 1, further comprising:

receiving an initial IP packet from a routed network to be transmitted to the first host;

searching an IP route table to identify the IRB interface in accordance with a destination IP address stored in a header of the initial IP packet;

identifying a Media Access Control ("MAC") address for the first host by searching an Address Resolution Protocol ("ARP") table;

obtaining an ARP response via the first unnumbered IP interface from the first host; and modifying the IP route table and ARP table based on the ARP response.

3. The method of claim 2, wherein obtaining an ARP response includes broadcasting an ARP request over all the bridge interfaces associate with the RB interface on not finding a valid ARP entry corresponding to the first host.

4. The method of claim 2, wherein updating the IP route table includes adding a route entry for the first host with the first unnumbered IP interface as the outgoing interface.

5. The method of claim 2, wherein updating the ARP table includes adding an ARP entry for the first host based on the ARP response.

6. The method of claim 2, wherein encapsulating the packet with the first host's hardware address includes searching an ARP table using the destination IP address to identify the first host's MAC address.

7. The method of claim 1, further comprising:
receiving a subsequent IP packet from the routed network to be transmitted to the first host;
obtaining the first unnumbered IP interface as the outgoing interface from the IP route table; and
forwarding the packet to the first host after encapsulating the packet with the first host's hardware address.

8. The method of claim 1, comprising:
identifying a second bridge interface that has been IRB enabled between a second host in the local bridge network and the bridging engine;
adding a second unnumbered IP interface between the second host and the routing engine in accordance with the second IRB enabled bridge interface; and
forwarding packets directly by the routing engine from the routed network to the second host via the second unnumbered IP interface.

9. The method of claim 1, wherein sending the first IP packet to the first host from the routing engine via the first unnumbered IP interface includes forwarding the first IP packet directly from the routing engine to the first host without going through the bridging engine.

10. A method for routing data, comprising:
receiving an initial Internet Protocol ("IP") packet over a routed network to be transmitted to a first host;
searching a first lookup table to determine a first bridge group in accordance with information stored in a header of the initial IP packet;
searching a second lookup table to identifying a Media Access Control ("MAC") address associated with the first host after obtaining information relating to the first bridge group;
obtaining a first unnumbered IP interface associated to a first bridge interface of the first host; and
storing the first unnumbered IP interface in a new entry of the first lookup table.

11. The method of claim 10, further comprising:
receiving a first IP packet over the routed network to be transmitted to the first host; and
identifying the first unnumbered IP interface for an outgoing interface to reach the first host in accordance with a search result from the first lookup table.

12. The method of claim 11, further comprising:
fetching the MAC address from the second lookup table and encapsulating the MAC address to the first IP packet; and
sending the first IP packet with the encapsulation to the first host from a routing engine via the first unnumbered IP interface.

13. The method of claim 10, further comprising:
receiving a second IP packet over the routed network to be transmitted to the second host; and
identifying a second unnumbered IP interface as an outgoing interface to reach the second host via a search of the first lookup table.

14. The method of claim 10,
wherein searching a first lookup table further includes searching a IP route table to identify the bridge group; and
wherein searching a second lookup table further includes searching an Address Resolution Protocol ("ARP") table to identifying a MAC address associated with the first host.

15. The method of claim 10, wherein obtaining the first unnumbered IP interface further includes broadcasting an ARP request over all the bridge interfaces in the bridge group and receiving an ARP response from the first host over the first unnumbered IP interface.

16. The method of claim 10, wherein storing the first unnumbered IP interface in a new entry of the first lookup table includes add a route entry for the first host with the first unnumbered IP interface as the outgoing interface.

17. An apparatus of transferring data, comprising:
means for identifying a first integrated routing and bridging ("IRB") enabled bridge interface between a first host and a bridging engine;
means for adding a first unnumbered Internet Protocol ("IP") interface between the first host and a routing engine corresponding to the first IRB enabled bridge interface;
means for encapsulating a first host destination hardware address associated with the first host to a first IP packet; and
means for sending the first IP packet to the first host from the routing engine via the first unnumbered IP interface.

18. The apparatus of claim 17, further comprising:
means for receiving an initial IP packet over a routed network to be transmitted to the first host;
means for searching an IP route table to identify the bridge group in accordance with information stored in a header of the initial IP packet;
means for identifying a Media Access Control ("MAC") address for the first host by performing an Address Resolution Protocol ("ARP") table; and
means for obtaining ARP response via the first unnumbered IP interface from the first host; and
means for modifying the IP route table and ARP table based on the ARP response.

19. The apparatus of claim 17, further comprising:
means for obtaining the first unnumbered IP interface as the outgoing interface from the IP route table; and
means for forwarding the packet to the first host after encapsulating the packet with the first host's hardware address.

20. The apparatus of claim 18, wherein means for obtaining an ARP response includes means for broadcasting an ARP request over all the bridge interfaces associate with the RB interface on not finding a valid ARP entry corresponding to the first host.

* * * * *

UNITED STATES PATENT AND TRADEMARK OFFICE
CERTIFICATE OF CORRECTION

PATENT NO.        : 7,856,024 B1
APPLICATION NO.   : 12/333609
DATED             : December 21, 2010
INVENTOR(S)       : Karuppiah et al.

It is certified that error appears in the above-identified patent and that said Letters Patent is hereby corrected as shown below:

Claim 10, (Column 7, line 41): replace "identifying" with "identify".

Claim 14 (Column 8, line 13): replace "identifying" with "identify".

Claim 20 (Column 8, line 58): replace "associate" with "associated".

Signed and Sealed this
Tenth Day of May, 2011

David J. Kappos
*Director of the United States Patent and Trademark Office*